United States Patent
Ito et al.

(10) Patent No.: US 9,137,064 B2
(45) Date of Patent: Sep. 15, 2015

(54) EQUALIZER DEVICE, RECEIVER DEVICE AND EQUALIZATION METHOD

(75) Inventors: Naosuke Ito, Tokyo (JP); Jun Ido, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/237,135

(22) PCT Filed: Feb. 22, 2012

(86) PCT No.: PCT/JP2012/054229
§ 371 (c)(1),
(2), (4) Date: Feb. 4, 2014

(87) PCT Pub. No.: WO2013/054550
PCT Pub. Date: Apr. 18, 2013

(65) Prior Publication Data
US 2014/0192852 A1 Jul. 10, 2014

(30) Foreign Application Priority Data
Oct. 14, 2011 (JP) ................ 2011-226587

(51) Int. Cl.
*H04L 27/01* (2006.01)
*H04B 3/06* (2006.01)

(52) U.S. Cl.
CPC . *H04L 27/01* (2013.01); *H04B 3/06* (2013.01)

(58) Field of Classification Search
CPC ............ H04L 25/03885; H04L 25/0202; H04L 25/03038; H04L 25/03057; H04L 25/03891; H04L 27/01
See application file for complete search history.

(56) References Cited

U.S. PATENT DOCUMENTS

| 5,323,422 A | 6/1994 | Ushirokawa |
| 5,579,344 A | 11/1996 | Namekata |

(Continued)

FOREIGN PATENT DOCUMENTS

| JP | 5-252067 A | 9/1993 |
| JP | 7-95107 A | 4/1995 |

(Continued)

OTHER PUBLICATIONS

Falconer et al., "Frequency Domain Equalization for Single-Carrier Broadband Wireless Systems", IEEE Communications Magazine, Apr. 2002, pp. 58-66, vol. 40, Issue 4.

(Continued)

*Primary Examiner* — Kenneth Lam
(74) *Attorney, Agent, or Firm* — Birch Stewart Kolasch & Birch, LLP

(57) ABSTRACT

The present invention is provided with: a CIR generating unit which generates an channel impulse response from a received signal; a CIR variation detection unit which uses a plurality of channel impulse responses generated from a plurality of different sections of the received signal by the CIR generating unit to detect an amount of variation in the channel impulse response; an equivalent width control unit which determines an equivalent width corresponding to a signal length used in equalization of the received signal such that the equivalent width is shortened as the amount of variation in the channel impulse response increases; and a waveform equalization unit which uses the channel impulse response generated by the CIR generating unit to equalize the received signal over the equivalent width determined by the equivalent width control unit and generate a demodulated signal.

19 Claims, 5 Drawing Sheets

(56) References Cited

U.S. PATENT DOCUMENTS

| | | |
|---|---|---|
| 6,907,064 B1 | 6/2005 | Tokunaga et al. |
| 7,136,111 B2 | 11/2006 | Kim |
| 7,180,552 B2 | 2/2007 | Kim |
| 7,269,213 B2 | 9/2007 | Takanashi et al. |
| 7,920,659 B2 | 4/2011 | Nishio et al. |
| 2005/0129143 A1* | 6/2005 | Kang et al. .............. 375/316 |
| 2008/0008233 A1* | 1/2008 | Cohen .................... 375/232 |
| 2008/0240293 A1* | 10/2008 | Kim et al. ............... 375/316 |
| 2008/0246881 A1* | 10/2008 | Kim et al. ............... 348/607 |
| 2010/0023990 A1* | 1/2010 | Chen et al. .............. 725/118 |
| 2010/0119016 A1* | 5/2010 | Ghosh .................... 375/340 |

FOREIGN PATENT DOCUMENTS

| | | |
|---|---|---|
| JP | 7-162361 A | 6/1995 |
| JP | 7-203253 A | 8/1995 |
| JP | 2001-168773 A | 6/2001 |
| JP | 2001-196977 A | 7/2001 |
| JP | 2006-115221 A | 4/2006 |
| JP | 2006-304192 A | 11/2006 |
| JP | 2007-201523 A | 8/2007 |
| JP | 2010-118920 A | 5/2010 |
| WO | WO 2013/008347 A1 | 1/2013 |

OTHER PUBLICATIONS

Heo at al., "Adaptive Sparse Equalizer Robust to Fast Fading and Long Delay Spread for ATSC DTV", IEEE Transactions on Consumer Electronics, Aug. 2005, pp. 803-808, vol. 51, Issue 3.

Yang et al., "Adaptive Step-Size and Block-Size FBLMS Algorithm", 2009 International Conference on Computer Engineering and Technology, ICCET '09, Jan. 22, 2009, pp. 8-12, vol. 2.

* cited by examiner

# EQUALIZER DEVICE, RECEIVER DEVICE AND EQUALIZATION METHOD

TECHNICAL FIELD

The present invention relates to an equalizer device, a receiver device, and an equalization method.

BACKGROUND ART

When a received signal is demodulated, it is necessary to correct (hereinafter, 'equalize') the phase and amplitude of the received signal to compensate for channel distortion and fading. In particular, when channel distortion is large and when the channel characteristics vary greatly over time, there is a need for techniques to improve equalization accuracy and techniques that ensure tracking of rapid changes in the channel.

There are two general types of equalization: time domain equalization and frequency domain equalization. Time domain equalization is an equalization method that feeds the received signal into an adaptive filter and compensates for distortion of the received signal while optimizing the filter coefficients by use of an adaptive algorithm. Frequency domain equalization is an equalization method that detects a CIR (Channel Impulse Response) in the time domain on the basis of the received signal, performs a Fourier transform on the detected result, and performs waveform equalization in the frequency domain. In the ATSC (Advanced Television Systems Committee) broadcasting standard using VSB modulation, which has been adopted in North America, for example, a known PN code signal is inserted as a field synchronization signal in specified data frames, so there are known methods of frequency domain equalization that perform CIR detection by using this known signal as a reference signal (see, for example, patent reference 1 and patent reference 2).

PRIOR ART REFERENCES

Patent References

Patent reference 1: U.S. Pat. No. 7,136,111
Patent reference 2: U.S. Pat. No. 7,180,552

SUMMARY OF THE INVENTION

Problems to be Solved by the Invention

Equalization in the frequency domain is carried out using the Fourier-transformed received signal and the CIR. Frequency domain equalization of a signal transmitted on a single carrier, as in VSB modulation, can then be carried out by performing the conversion to the frequency domain at arbitrary intervals, differing from OFDM (Orthogonal Frequency Division Multiplexing) multicarrier transmission. In OFDM, since the signal is demodulated by performing a Fourier transform of a single symbol consisting of a large number of carriers and using the information in each carrier, the Fourier transform and frequency domain equalization process must take place at fixed intervals. In VSB modulated single carrier transmission, however, after waveform equalization of the transformed signal, the signal is returned to the time domain by an inverse Fourier transform and then demodulated, so an arbitrary number of symbols can be used as the length (referred to below as the equivalent width) of the signals used in the Fourier transform to the frequency domain, in frequency domain equalization, and in the inverse Fourier transform to the time domain.

The Fourier transform interval, which corresponds to the wavelength equalization interval, affects the temporal width of the CIR used in waveform equalization and the speed of tracking of temporal variations. When a short Fourier transform interval is used, the temporal width of the CIR is shortened, but the speed with which temporal variations in the CIR are tracked becomes faster. The range over which delayed waves are detected is thereby shortened, which degrades the accuracy of the equalization process, but the equalization process becomes robust with respect to temporal variations on the channel. When a long Fourier transform interval is used, the speed with which temporal variations in the CIR are tracked becomes slower, but the temporal width of the CIR is lengthened. The equalization process is thereby weakened with respect to temporal variations on the channel, but the range over which delayed waves are detected is widened, which improves the equalization accuracy. This tradeoff must be considered when the equalization interval is determined.

Single carrier transmission systems such as the ATSC system also generally lack a CP (Cyclic Prefix) like that found in the GI (Guard Interval) in OFDM. Frequency domain equalization therefore becomes a recursive convolution, in which components at the back end of the Fourier transform interval of the received signal affect the components at the front end of the Fourier transform interval, which degrades accuracy. Performing equalization with a short Fourier transform interval therefore produces a relative worsening of the error rate. Tracking of temporal variations of the channel and the degradation of equalization accuracy due to recursive convolution effects are therefore another tradeoff that must be considered when the equalization interval is determined.

In the multivalued VSB modulation scheme used in ATSC, the known signal referred to as the field synchronization signal occurs at intervals of about 2.4 ms, and this signal can be used for CIR detection. There is also a problem, however, in that the amount of temporal variation of the channel cannot be adequately detected when the temporal variation occurs within the space of 2.4 ms.

The present invention addresses the above problems with the object of enabling waveform equalization to be performed with provision for temporal variation of the channel.

Means for Solving the Problem

An equalizer device according to one aspect of the invention includes: a CIR generating unit for generating an channel impulse response from a received signal; a CIR variation detection unit for using a plurality of channel impulse responses generated from a plurality of different sections of the received signal by the CIR generating unit to detect an amount of variation in the channel impulse response; an equivalent width control unit for determining an equivalent width corresponding to a signal length used in equalization of the received signal such that the equivalent width is shortened as the amount of variation in the channel impulse response increases; and a waveform equalization unit for using the channel impulse response generated by the CIR generating unit to equalize the received signal over the equivalent width determined b the equivalent width control unit and generate a demodulated signal.

Effects of the Invention

According to one aspect of the invention, waveform equalization can be performed with provision for temporal variation of the channel.

MODE FOR CARRYING OUT THE INVENTION

First Embodiment

Figure 1:
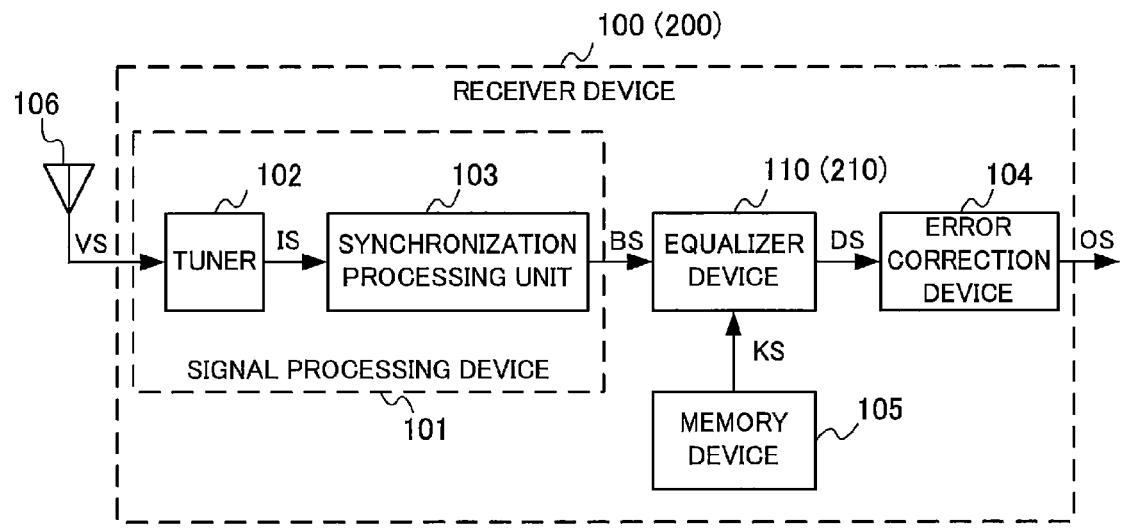
FIG. 1 is a block diagram schematically showing the structure of a receiver device according to first and second embodiments.

FIG. 1 is a block diagram schematically showing the structure of the receiver device 100 according to the first embodiment. The receiver device 100 has a signal processing device 101, an error correction device 104, a memory device 105, and an equalizer device 110. The reference characters in parentheses in FIG. 1 apply to the second embodiment.

The signal processing device 101 generates a received signal by converting a broadcast signal (a VSB signal in this embodiment) received by an antenna 106 to a given frequency band. The signal processing device 101 includes a tuner 102 and a synchronization processing unit 103.

The tuner 102 converts the frequency of the VSB signal VS received by the antenna 106 to generate an IF (Intermediate Frequency) signal IS and supplies this IF signal IS to the synchronization processing unit 103.

The synchronization processing unit 103 synchronously detects the IF signal IS to generate a baseband signal and supplies this baseband signal to the equalizer device 110 as a received signal BS.

The equalizer device 110 generates a demodulated signal DS by performing an equalization process on the received signal BS and supplies the demodulated signal DS to the error correction device 104.

The error correction device 104 generates an output signal OS by performing an error correction process on the demodulated signal DS and outputs the output signal OS.

The memory device 105 stores information needed in the processing in the receiver device 100. For example, in this embodiment the memory device 105 stores a known signal KS used in the equalization process performed by the equalizer device 110.

Figure 2:
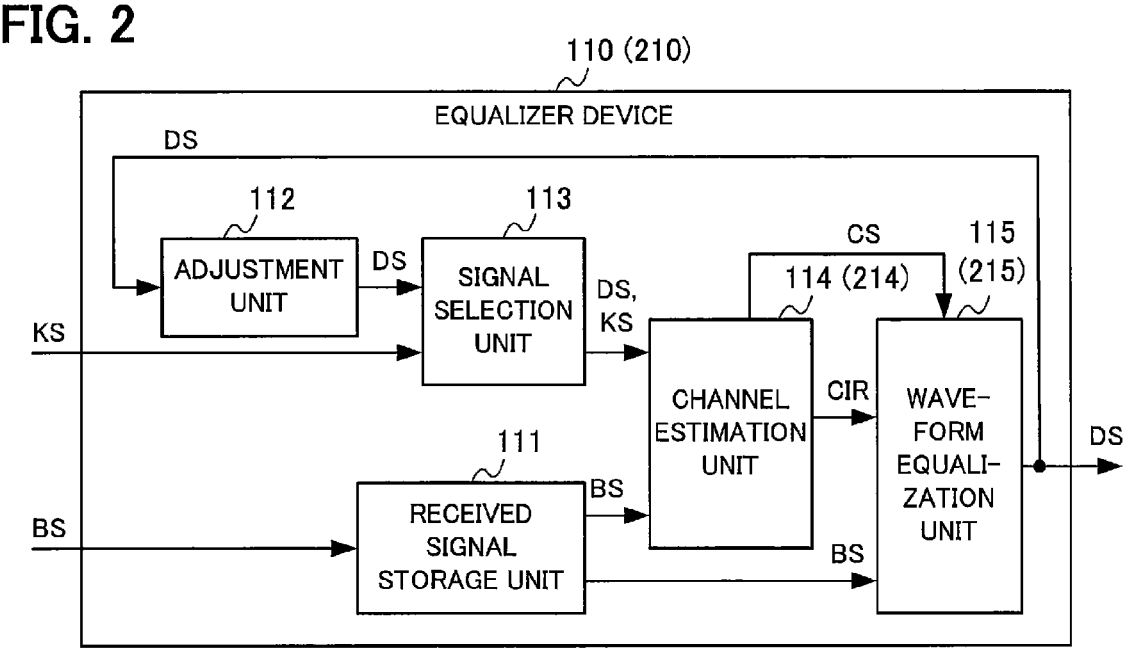
FIG. 2 is a block diagram schematically showing the structure of the equalizer device in the first and second embodiments.

FIG. 2 is a block diagram schematically showing the structure of the equalizer device 110 in the first embodiment. The equalizer device 110 includes a received signal storage unit 111, an adjustment unit 112, a signal selection unit 113, a channel estimation unit 114, and a waveform equalization unit 115. The reference characters in parentheses apply to the second embodiment.

The received signal storage unit 111 receives the received signal BS, which has been transmitted by single-carrier transmission and converted to a given frequency band, as its input, and stores the received signal in a memory (not shown).

The received signal storage unit 111 supplies the channel estimation unit 114 with a section of the received signal BS used for channel estimation, at timings at which channel estimation is carried out. The section of the received signal BS used for channel estimation is supplied as a signal temporally synchronized with the demodulated signal DS or the known signal KS selected by the signal selection unit 113.

The received signal storage unit 111 supplies the waveform equalization unit 115 with a section of the received signal BS on which waveform equalization is performed, at timings at which waveform equalization is carried out. The section of the received signal BS on which waveform equalization is performed is supplied as a signal corresponding to the Fourier transform interval in a Fourier transform performed in the waveform equalization unit 115.

The adjustment unit 112 adjusts the demodulated signal DS supplied from the waveform equalization unit 115 so that it can be compared with the received signal BS as a signal conforming to the known signal KS, and supplies the adjusted signal to the signal selection unit 113.

For example, if the received signal BS is octal, the demodulated signal DS supplied from the waveform equalization unit 115 generally has higher precision than an octal signal. The adjustment unit 112 makes a hard or soft decision and converts the demodulated signal DS supplied from the waveform equalization unit 115 to octal form. Since the received signal BS is Trellis-encoded in the ATSC system, the adjustment unit 112 may use a Viterbi decoder to convert the signal to octal form. The result of the determination obtained in that case has higher reliability than the result of a hard decision made by using a threshold value responsive to demodulation.

The adjustment unit 112 may further perform error correction on the demodulated signal DS supplied from the waveform equalization unit 115. CIR detection can then be carried out by using a demodulated signal including fewer errors.

When a CIR is detected in sections of the received signal corresponding to signals other than the known signal KS, the demodulated signal DS as adjusted by the adjustment unit 112 is used as a signal conforming to the known signal KS. The channel estimation unit 114 can thereby detect the CIR and the amount of CIR variation in sections of the received signal BS corresponding to signals other than the known signal KS.

The signal selection unit 113 selects one of the demodulated signal DS supplied from the adjustment unit 112 and the known signal KS supplied from the memory device 105 as the signal to be used in channel estimation performed in the channel estimation unit 114, and supplies the selected signal to the channel estimation unit 114. To use the known signal KS to detect a CIR in a section of the received signal BS including a signal corresponding to the known signal KS, the signal selection unit 113 selects the known signal KS; to use the demodulated signal DS to detect a CIR in a section of the received signal BS including a signal other than the known signal KS, the signal selection unit 113 selects the demodulated signal DS.

The channel estimation unit 114 detects the CIR by using the known signal KS or demodulated signal DS supplied from the signal selection unit 113 and the received signal BS supplied from the received signal storage unit 111 and determines an equivalent width for equalization. The channel estimation unit 114 then supplies the waveform equalization unit 115 with the detected CIR and a control signal CS indicating the determined equivalent width.

Figure 3:
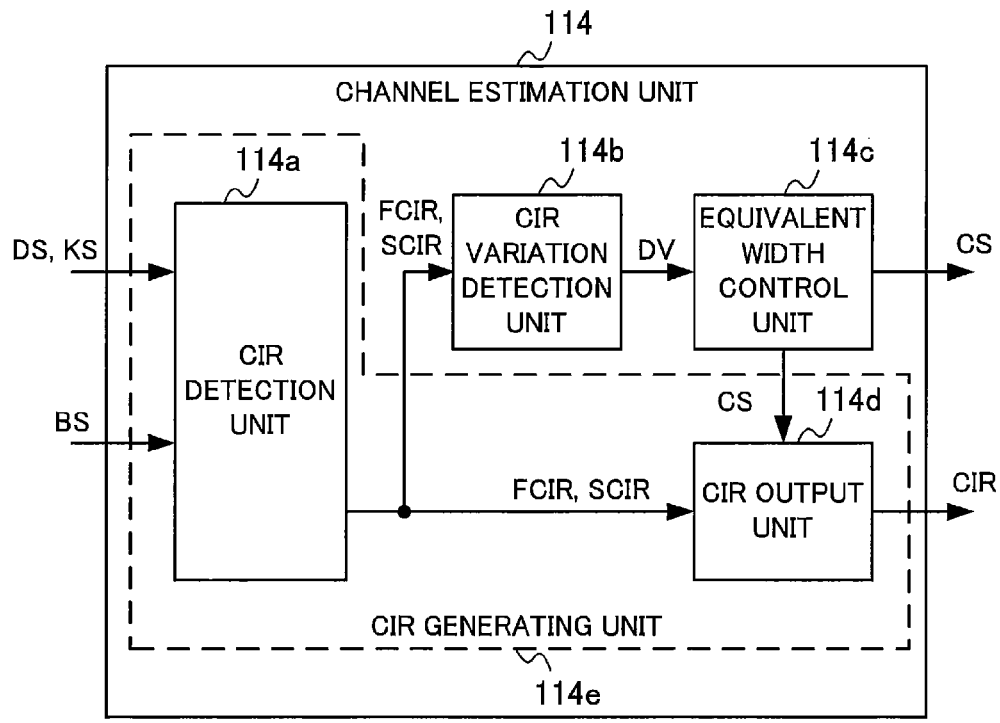
FIG. 3 is a block diagram schematically showing the structure of the channel estimation unit in the first embodiment.

FIG. 3 is a block diagram schematically showing the structure of the channel estimation unit 114. The channel estimation unit 114 includes a CIR detection unit 114a, a CIR variation detection unit 114b, an equivalent width control unit 114c, and a CIR output unit 114d. The CIR detection unit 114a and CIR output unit 114d form a CIR generating unit 114e.

The CIR detection unit 114a detects the CIR by using the known signal KS or demodulated signal DS supplied from the signal selection unit 113 and the received signal BS supplied from the received signal storage unit 111, and supplies the detected CIR to the CIR variation detection unit 114b and CIR output unit 114d. The CIR is detected here by, for example, the method of regarding an adaptive filter as the channel, inputting the known signal KS or demodulated signal DS to the adaptive filter, updating the filter coefficients to make the output correspond to the received signal, and regarding the updated filter coefficients as the CIR. If the known signal KS is input to the adaptive filter, the filter coefficients of the adaptive filter are updated to make the output match the section of the received signal BS including the known signal KS. If the demodulated signal DS is input to the adaptive filter, the filter coefficients of the adaptive filter are updated to make the output match the section of the received signal BS from which the input demodulated signal DS was generated. The CIR detected on the basis of the known signal KS will also be referred to as a first CIR (FCIR), and the CIR detected on a basis of, the demodulated signal DS will also be referred to as a second CIR (SCIR).

The CIR detection unit 114a may detect the channel in the frequency domain. Any CIR detection algorithm may be used in this invention, so a detailed description will be omitted here.

The CIR variation detection unit 114b calculates a channel characteristics variation amount DV on the basis of the CIRs (FCIR, SCIR) supplied from the CIR detection unit 114a. The CIR variation detection unit 114b may calculate the channel characteristics variation amount DV from the result of a comparison between adjacent CIRs in the time domain, for example. In that operation, the CIR variation detection unit 114b records the CIRs to be used in the calculation, such as the immediately preceding CIR, in a recording unit (not shown). The CIR variation detection unit 114b may also compare a CIR obtained by performing linear interpolation from a plurality of first CIRs with a second CIR detected between those first CIRs.

The channel characteristics variation amount DV may be any quantity that indicates an amount of CIR-to-CIR variation. For example, the channel characteristics variation amount DV may be obtained from a sum of absolute values of differences among corresponding tap values or a sum of squares of differences among corresponding tap values in the CIRs. Accordingly, the amount of variation among CIRs can be obtained with a relatively small-scale circuit.

The CIR variation detection unit 114b may also correlate CIRs by multiplying corresponding tap values and taking the sum. The channel characteristics variation amount DV detected by taking the correlation is not readily affected by noise. Unlike the sum of differences, the sum of products increases as the correlation becomes closer and the amount of variation between CIRs decreases.

The interval over which the sum is calculated may be adjusted in accordance with the equivalent width. The amounts of CIR-to-CIR variation detected by using three or more CIRs may be summed to obtain the channel characteristics variation amount DV. Noise effects can be reduced by summing a plurality of amounts of variation.

The CIR variation detection unit 114b supplies the calculated channel characteristics variation amount DV to the equivalent width control unit 114c.

The equivalent width control unit 114c determines the equivalent width in accordance with the channel characteristics variation amount DV supplied from the CIR variation detection unit 114b. The equivalent width control unit 114c then supplies a control signal CS indicating the determined equivalent width to the CIR output unit 114d and waveform equalization unit 115. By comparing the channel characteristics variation amount DV with predetermined threshold values, the equivalent width control unit 114c determines an equivalent width corresponding to a range including the channel characteristics variation amount DV. If n different intervals (n being a natural number not smaller than 2) are used as equivalent widths, n−1 threshold values are necessary. The determined equivalent width should decrease as the channel characteristics variation amount DV increases. For example, if a single field of the received signal BS includes 313 segments and if each segment includes 832 symbols, the equivalent width control unit 114c can determine the equivalent width in units equal to a block consisting of from a fraction of one segment to a multiple of one segment.

Control of the equivalent width by the equivalent width control unit 114c will now be described with reference to FIGS. 4 to 6. In these drawings, the horizontal axis corresponds to time and the vertical axis corresponds to the CIR.

Figure 4:
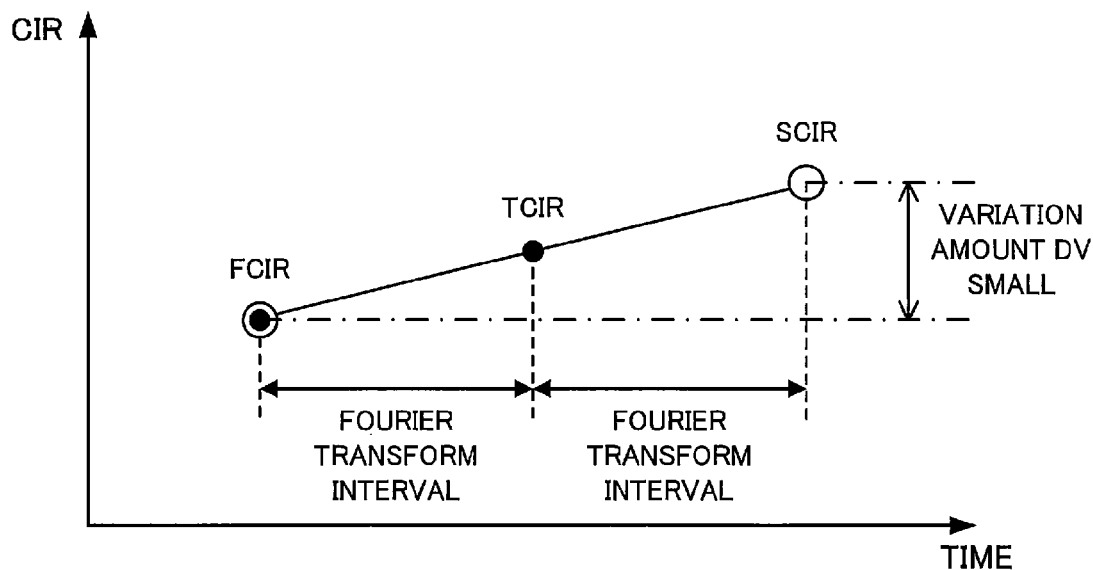
FIG. 4 is a schematic diagram showing the relation between equivalent width and the CIR in the first embodiment when the amount of channel variation is small.

FIG. 4 is a schematic diagram showing the relation between equivalent width and the CIR when the channel characteristics variation amount DV is small. In FIG. 4 (and in FIGS. 5 and 6), the vertical axis indicates the sum of absolute values of the CIR at the tap positions. The width (time) of the Fourier transform interval shown in FIG. 4 is the equivalent width.

As shown in FIG. 4, if the channel characteristics variation amount DV is small, the equalizer device 110 can carry out equalization by using a CIR that includes signals with long delays by making the width of the Fourier transform interval (equivalent width) rather wide.

Figure 5:
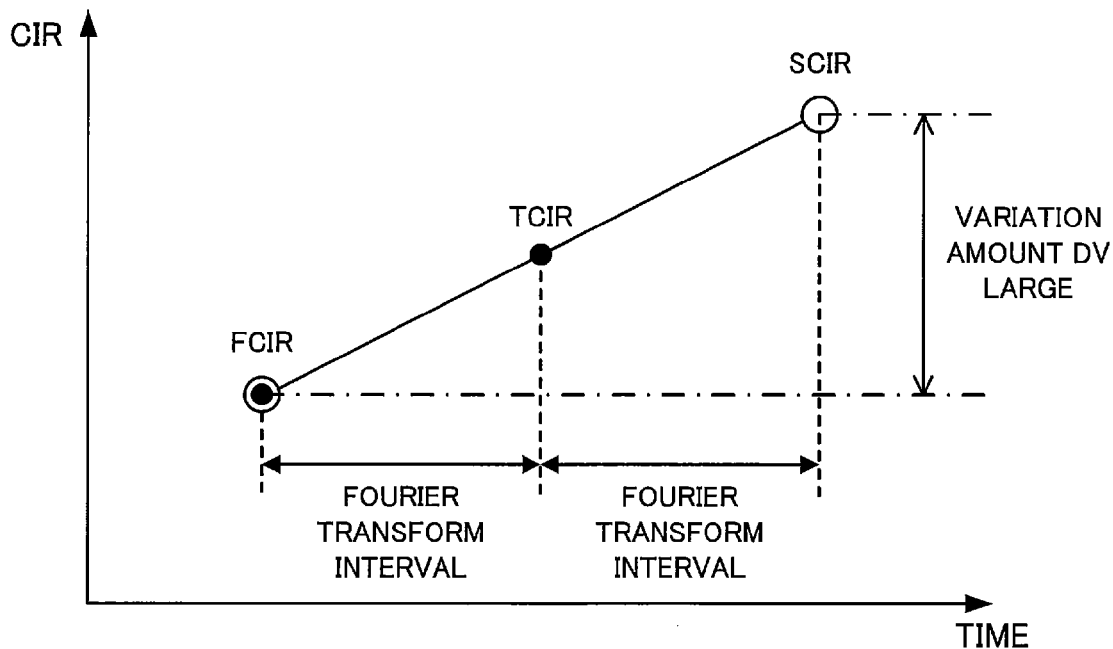
FIG. 5 is a schematic diagram showing an example of the relation between equivalent width and the CIR in the first embodiment when the amount of channel variation is large.

FIG. 5 is a schematic diagram showing the relation between the equivalent width and the CIR when the channel characteristics variation amount DV is large. In FIG. 5, the channel characteristics variation amount DV is large, but the Fourier transform interval is set to the same equivalent width as in FIG. 4.

In the example shown in FIG. 5, the CIR varies greatly while the Fourier transform is being performed (in the Fourier transform interval), and this could degrade the equalization accuracy.

Figure 6:
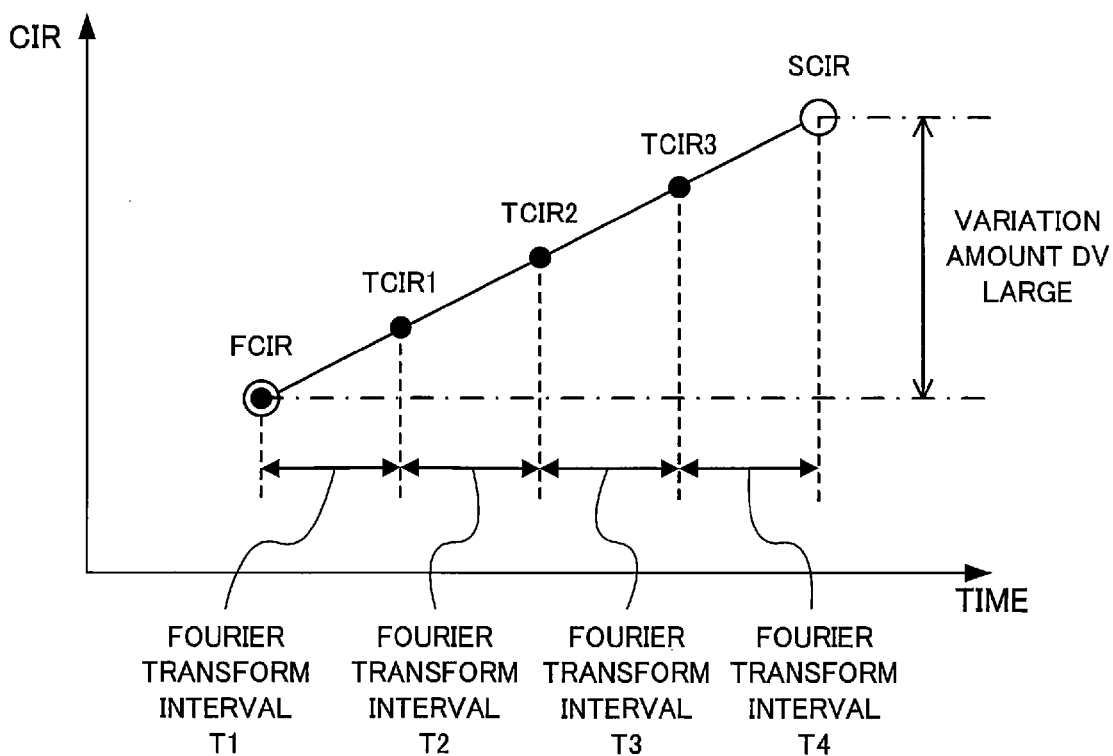
FIG. 6 is a schematic diagram showing another example of the relation between equivalent width and the CIR in the first embodiment when the amount of channel variation is large.

FIG. 6 is a schematic diagram showing the relation between the equivalent width and the CIR when the channel characteristics variation amount DV is large. In FIG. 6, the channel characteristics variation amount DV is large, but the Fourier transform interval is set to an equivalent width shorter than in FIGS. 4 and 5.

In the example shown in FIG. 6, the amount of CIR variation during the Fourier transformation (in the Fourier transform interval) is small, and when the long delay components are sufficiently small, the equalization accuracy would seem to be better than in FIG. 5.

Returning to the description of FIG. 3, the CIR output unit 114d controls the CIR output timing in accordance with the control signal CS supplied from the equivalent width control unit 114c. Here, in each Fourier transform interval corresponding to the equivalent width supplied from the equivalent width control unit 114c, the CIR output unit 114d supplies the waveform equalization unit 115 with a CIR corresponding to the Fourier transform interval. When the CIRs (FCIR, SCIR) supplied from the CIR detection unit 114a are associated with the Fourier transform intervals, if there are not enough CIRs, the CIR output unit 114d calculates the missing CIRs from the CIRs supplied from the CIR detection unit 114a. A CIR calculated in this way will also be referred to below as a third CIR (TCIR). For example, the CIR output unit 114d calculates a third CIR by interpolating or extrapolating from a plurality of CIRs (FCIR, SCIR) supplied from the CIR detection unit 114a. In the example shown in FIG. 6, the CIR output unit 114d associates the CIR supplied from the CIR detection unit 114a (FCIR in FIG. 6) with a Fourier transform interval T1 based on the equivalent width supplied from the equivalent width control unit 114c. The CIR output unit 114d then calculates third CIRs TCIR1 to TCIR3 by interpolating from the CIRs supplied from the CIR detection unit 114a (FCIR and SCIR in FIG. 6) and associates them with Fourier transform intervals T2 to T4, respectively.

The CIR output unit 114d may also obtain a third CIR by, for example performing linear interpolation or extrapolation in the time domain from two adjacent ones of the CIRs supplied from the CIR detection unit 114a.

Since the precision of the first CIRs detected using the known signal KS differs from the precision of the second CIRs detected using the demodulated signal DS, the CIR output unit 114d may weight the CIRs when performing interpolation or extrapolation. In that case, since the first CIRs can be considered to have higher precision, greater weight should be given to the first CIRs.

The CIR output unit 114d may also use three or more CIRs supplied from the CIR detection unit 114a and perform quadratic or higher-order interpolation or extrapolation to obtain a CIR for a section in which no CIR has been detected.

The CIR output unit 114d supplies the waveform equalization unit 115 with the corresponding CIR at a timing responsive to the equivalent width indicated by the control signal CS. In this embodiment, the CIR supplied to the waveform equalization unit 115 is a first CIR, a second CIR, or a third CIR.

Returning to the description of FIG. 2, the waveform equalization unit 115 performs waveform equalization in the frequency domain, using the CIRs and the control signal CS supplied from the channel estimation unit 114 and the timing-adjusted received signal BS supplied from the received signal storage unit 111. Following waveform equalization, the waveform equalization unit 115 outputs the demodulated signal DS.

Figure 7:
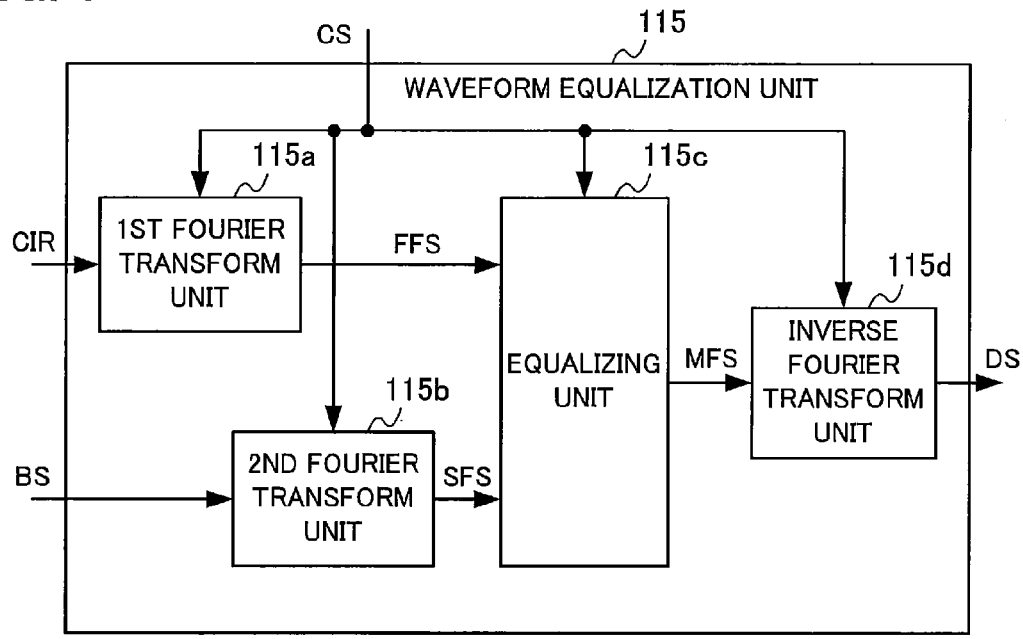
FIG. 7 is a block diagram schematically showing the structure of the waveform equalization unit in the first embodiment.

FIG. 7 is a block diagram schematically showing the structure of the waveform equalization unit 115. The waveform equalization unit 115 includes a first Fourier transform unit 115a, a second Fourier transform unit 115b, an equalizing unit 115c, and an inverse Fourier transform unit 115d.

The first Fourier transform unit 115a generates a channel estimation signal FFS by performing a Fourier transform on the CIR received from the channel estimation unit 114 over a Fourier transform interval based on the equivalent width indicated by the control signal CS received from the channel estimation unit 114. If the width of the CIR supplied from the channel estimation unit 114 exceeds the equivalent width supplied from the channel estimation unit 114, the first Fourier transform unit 115a performs the Fourier transform by discarding the values of the filter coefficients in the CIR that are disposed in tap positions with large delay. The first Fourier transform unit 115a supplies the channel estimation signal FFS to the equalizing unit 115c.

The second Fourier transform unit 115b generates a frequency domain signal SFS by performing a Fourier transform on the received signal BS supplied from the received signal storage unit 111 over a Fourier transform interval based on the equivalent width indicated by the control signal CS supplied from the channel estimation unit 114. The second Fourier transform unit 115b supplies the frequency domain signal SFS to the equalizing unit 115c.

The equalizing unit 115c generates an equalized signal MFS in each Fourier transform interval based on the equivalent width indicated by the control signal CS supplied from the channel estimation unit 114, by performing frequency domain equalization of the frequency domain signal SFS supplied from the second Fourier transform unit 115b on the basis of the channel estimation signal FFS supplied from the first Fourier transform unit 115a. The equalizing unit 115c then supplies the equalized signal MFS to the inverse Fourier transform unit 115d.

In each Fourier transform interval based on the equivalent width indicated by the control signal CS output from the channel estimation unit 114, the inverse Fourier transform unit 115d generates a demodulated signal DS by performing an inverse Fourier transform that returns the equalized signal MFS supplied from the equalizing unit 115c to the time domain. The inverse Fourier transform unit 115d then outputs the demodulated signal DS.

According to the first embodiment, waveform equalization can be performed in accordance with temporal variations in the channel by using the demodulated signal DS in a section not including the known signal KS to detect a CIR (SCIR), and by controlling the equivalent width in accordance with the channel characteristics variation amount DV. In the first embodiment, accurate amounts of variation can be detected by using the results of CIR detection to detect the channel characteristics variation amount DV.

Second Embodiment

In the first embodiment, the equivalent width is determined from the channel characteristics variation amount DV alone. An embodiment in which detected long delay components are also used to determine the equivalent width will now be described. In the first embodiment, Fourier transformation, equalization, and inverse Fourier transformation are controlled on the basis of the equivalent width. In the embodiment described here, multiplication of the received signal BS by a window function and overlapping of the Fourier transform results are also controlled in accordance with the equivalent width.

As shown in FIG. 1, the receiver device 200 according to a second embodiment includes a signal processing device 101, an equalizer device 210, an error correction device 104, and a memory device 105. The receiver device 200 in the second embodiment differs from the receiver device 100 in the first embodiment in regard to the equalizer device 210.

As shown in FIG. 2, the equalizer device 210 in the second embodiment includes a received signal storage unit 111, an adjustment unit 112, a signal selection unit 113, a channel estimation unit 214, and a waveform equalization unit 215. The equalizer device 210 in the second embodiment differs from the equalizer device 110 in the first embodiment in regard to the channel estimation unit 214 and waveform equalization unit 215.

The channel estimation unit 214 detects the CIR by using the known signal KS or demodulated signal DS supplied from the signal selection unit 113 and the received signal BS supplied from the received signal storage unit 111, and determines an equivalent width for equalization. The channel estimation unit 214 then supplies the detected CIR and a control signal CS indicating the determined equivalent width to the waveform equalization unit 215.

Figure 8:
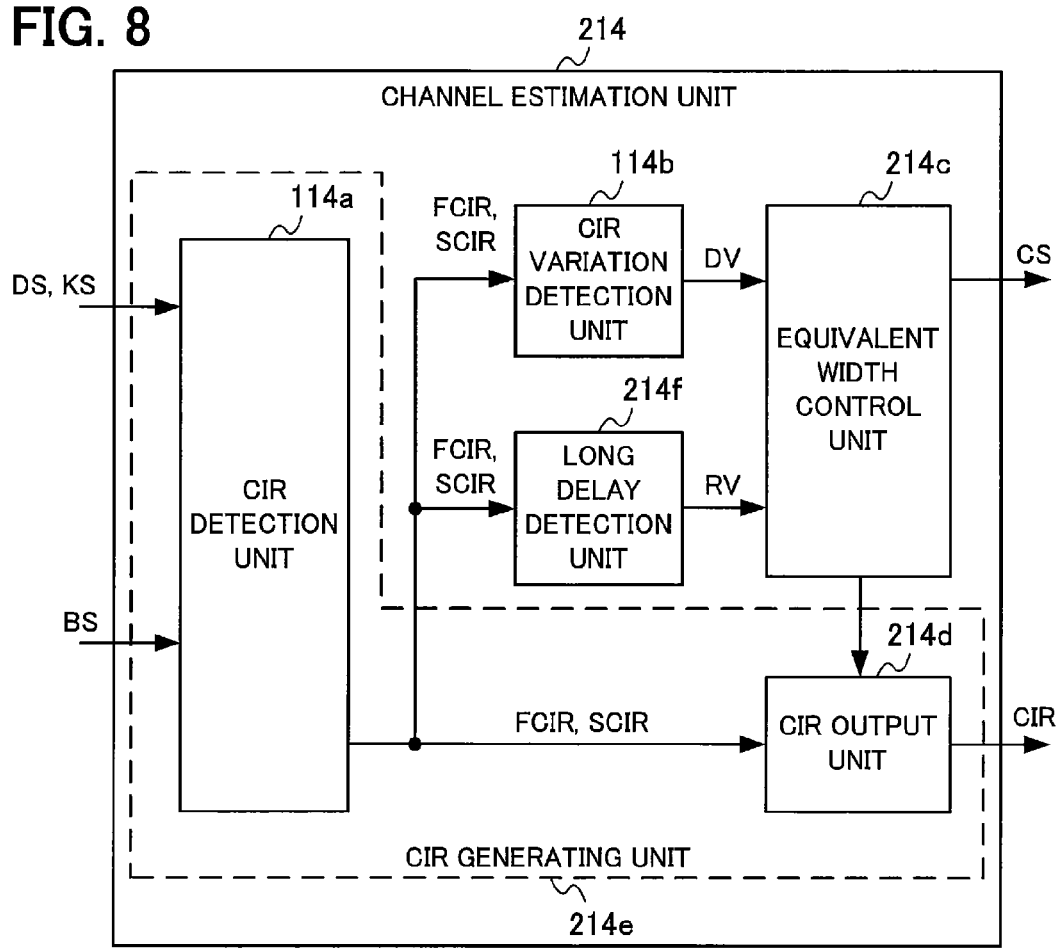
FIG. 8 is a block diagram schematically showing the structure of the channel estimation unit in the second embodiment.

FIG. 8 is a block diagram schematically showing the structure of the channel estimation unit 214. The channel estimation unit 214 includes a CIR detection unit 114a, a CIR variation detection unit 114b, an equivalent width control unit 214c, a CIR output unit 214d, and a long delay detection unit 214f. The CIR detection unit 114a and CIR output unit 214d form a CIR generating unit 214e. The channel estimation unit 214 in the second embodiment differs from the channel estimation unit 114 in the first embodiment in regard to the processes performed in the equivalent width control unit 214c and the CIR output unit 214d and in having the additional long delay detection unit 214f.

The long delay detection unit 214f detects the magnitude and position of long delay components in the CIR supplied from the CIR detection unit 114a. The position and magnitude of the long delay components in the CIR correspond to tap positions outside (more delayed than) a predetermined tap position and the magnitudes of the filter coefficients in those tap positions. The tap position predetermined here as a threshold value for determining whether a delay is long should be the tap position with the largest amount of delay among the taps corresponding to a predetermined minimum equivalent width value. The long delay detection unit 214f identifies, among the filter coefficients having values exceeding a predetermined threshold value included in the CIR supplied from the channel estimation unit 114, filter coefficients in tap positions more delayed than the predetermined tap position, and detects the magnitudes and tap positions (tap numbers) of the identified filter coefficients as the magnitude and position of long delay components.

As detected results RV, the long delay detection unit 214f supplies the equivalent width control unit 214c with the magnitude and position of the long delay components in the CIR supplied from the CIR detection unit 114a.

The equivalent width control unit 214c determines the equivalent width in accordance with the channel characteristics variation amount DV supplied from the CIR variation detection unit 114b and the detected results RV supplied from the long delay detection unit 214f. It is necessary here for the equivalent width to be shortened as the channel characteristics variation amount DV increases, to be lengthened as the magnitude of the long delay components indicated by the detected results RV increase, and to be lengthened as the amount of delay corresponding to the position of the long delay components indicated by the detected results RV increases.

For example, the equivalent width control unit 214c calculates the sum of the values of the filter coefficients given as magnitudes of long delay components to obtain the value of the magnitude of the long delay components. The equivalent width control unit 214c calculates the sum of the tap numbers supplied as the positions of long delay components to obtain the value of the position of the long delay components. Alternatively, the value of the magnitude of the long delay components may be the maximum value of the absolute values of filter coefficients given as magnitudes of long delay components, and the value of the position of the long delay components may be the maximum value of the tap numbers given as positions of long delay components.

The equivalent width control unit 214c may also determine a corresponding equivalent width from a predetermined set of equivalent widths, for each combination of the range in which the channel characteristics variation amount DV lies, the range in which the calculated value of the magnitude of the long delay components lies, and the range in which the calculated value of the position of the long delay components lies.

The equivalent width control unit 214c may also determine a corresponding equivalent width from a predetermined set of equivalent widths for each range of a value calculated by the formula (1) below.

$$\frac{(\text{Channel characteristics variation amount } DV)}{(\text{Magnitude of long delay components}) \times (\text{Position of long delay components})} \quad (1)$$

The equivalent width control unit 214c then supplies a control signal CS indicating the determined equivalent width to the CIR output unit 214d and the waveform equalization unit 215.

Since the waveform equalization unit 215 in the second embodiment performs overlapping, for the same equivalent width, more CIR values are used than when overlapping is not performed. Therefore, even if the amount of CIR variation is large, for example, the equivalent width determined by the equivalent width control unit 214c in the second embodiment should be greater than the equivalent width determined in the first embodiment.

The CIR output unit 214d controls the CIR output timing in accordance with the control signal CS supplied from the equivalent width control unit 214c. The CIR output unit 214d in the second embodiment performs the same processing as performed in the CIR output unit 114d in the first embodiment and also controls the CIR output timing in accordance with the overlapping performed by the waveform equalization unit 215. If the waveform equalization unit 215 performs 50% overlapping (half overlapping), the CIR output unit 214d should output the corresponding CIRs at intervals corresponding to half the intervals used in the first embodiment. The CIR output unit 214d may generate CIRs for overlapping by interpolation or extrapolation from the CIRs supplied from the CIR detection unit 114a. Alternatively, the CIR output unit 214d may output CIRs generated in the same way as in the first embodiment at shifted timings, as CIRs for overlapping.

Returning to the description of the description of FIG. 2, the waveform equalization unit 215 performs waveform equalization in the frequency domain, using the CIRs and the control signal CS supplied from the channel estimation unit 214 and the timing-adjusted received signal BS supplied from the received signal storage unit 111. Following waveform equalization, the waveform equalization unit 215 outputs the demodulated signal DS.

Figure 9:
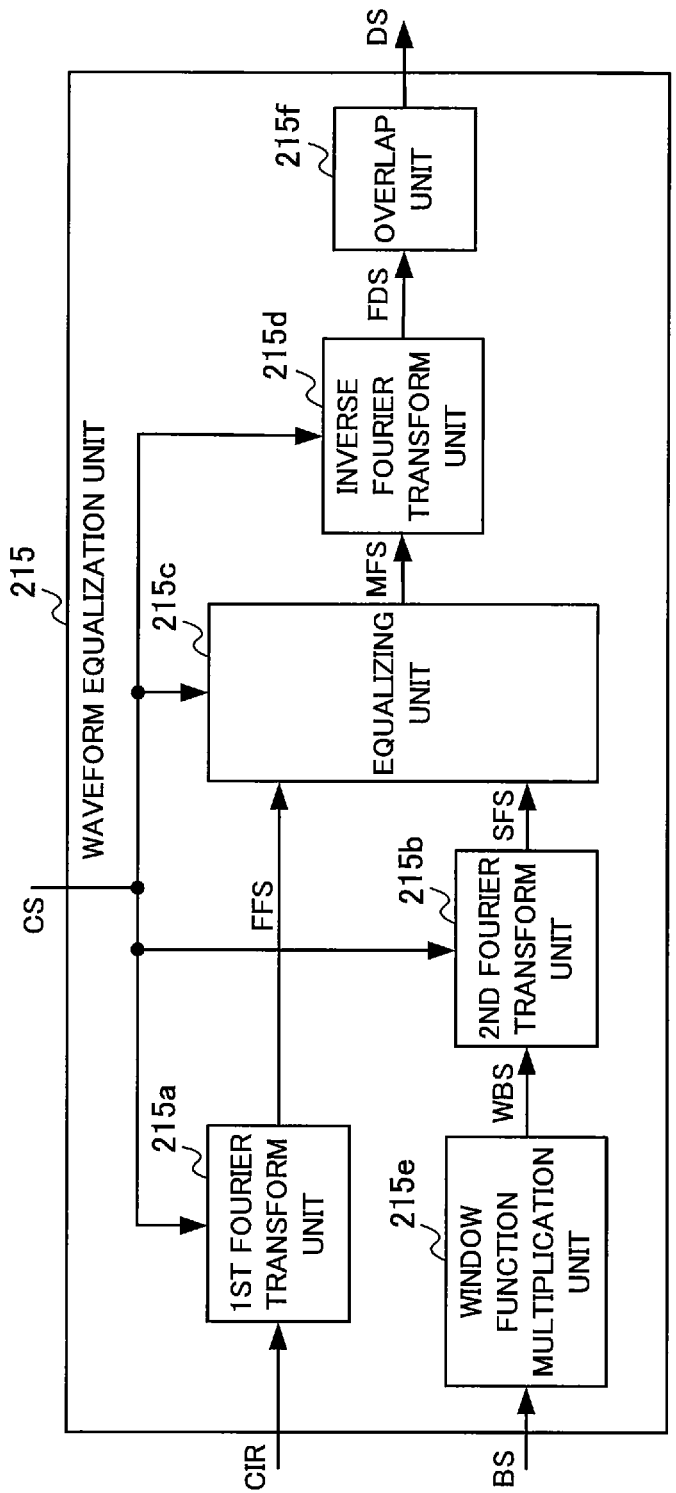
FIG. 9 is a block diagram schematically showing the structure of the waveform equalization unit in the second embodiment.

FIG. 9 is a block diagram schematically showing the structure of the waveform equalization unit 215. The waveform equalization unit 215 includes a first Fourier transform unit 215a, a second Fourier transform unit 215b, an equalizing unit 215c, an inverse Fourier transform unit 215d, a window function multiplication unit 215e, and an overlap unit 215f.

Like the first Fourier transform unit 115a in the first embodiment, the first Fourier transform unit 215a generates a channel estimation signal FFS by performing a Fourier transform on the CIR received from the channel estimation unit 214 over a Fourier transform interval based on the equivalent width indicated by the control signal CS supplied from the channel estimation unit 214. The first Fourier transform unit 215a in the second embodiment, however, also generates the channel estimation signal FFS at a timing shifted by a predetermined period for signal overlapping in the overlap unit 215f.

The first Fourier transform unit 215a then supplies the generated channel estimation signals FFS to the equalizing unit 215c.

The window function multiplication unit 215e generates a windowed received signal WBS by multiplying the received signal BS supplied from the received signal storage unit 111 by a window function corresponding to the equivalent width indicated by the control signal CS supplied from the channel estimation unit 214. The section in which values are extracted by the window function is determined in accordance with the equivalent width indicated by the control signal CS supplied from the channel estimation unit 214. The window function is used for weighting in order to reduce discontinuity effects at the boundaries of the Fourier transform interval. An exemplary window function is the Hanning window.

The window function multiplication unit 215e then supplies the windowed received signal WBS to the second Fourier transform unit 215b.

The second Fourier transform unit 215b performs a Fourier transform on a windowed received signal WBS supplied from the window function multiplication unit 215e, over the Fourier transform interval based on the equivalent width indicated by the control signal CS supplied from the channel estimation unit 114, thereby generating a frequency domain signal SFS.

The second Fourier transform unit 215b then supplies the frequency domain signal SFS to the equalizing unit 215c.

The equalizing unit 215c generates an equalized signal MFS in each Fourier transform interval based on the equivalent width indicated by the control signal CS supplied from the channel estimation unit 214, by performing frequency domain equalization of the frequency domain signal SFS supplied from the second Fourier transform unit 215b on the basis of the channel estimation signal FFS supplied from the first Fourier transform unit 215a. The equalizing unit 215c then supplies the equalized signal MFS to the inverse Fourier transform unit 215d.

In each Fourier transform interval based on the equivalent width indicated by the control signal CS output from the channel estimation unit 214, the inverse Fourier transform unit 215d generates a first demodulated signal FDS by performing an inverse Fourier transform that returns the equalized signal MFS supplied from the equalizing unit 215c to the time domain.

The inverse Fourier transform unit 215d then supplies the first demodulated signal FDS to the overlap unit 215f.

The overlap unit 215f generates a demodulated signal DS by overlapping the first demodulated signal FDS supplied from the inverse Fourier transform unit 215d in a way that corresponds with the equivalent width indicated by the control signal CS supplied from the channel estimation unit 214. Overlapping here is an operation that reconstructs the original waveform by overlaying signals in redundant sections in order to cancel out the effect of the window function by which the received signal BS is multiplied.

The overlap unit 215f then outputs the demodulated signal DS.

In the second embodiment, the magnitude and position of the long delay components of the CIR are considered in determining the equivalent width, so equalization can be performed on intervals suitable for the channel with the effects of those long delay components taken into account. Since the overlap interval and window function used in equalization are controlled in accordance with the equivalent width, waveform equalization can be performed with high precision even at the boundaries of the Fourier transform interval.

In the first and second embodiments described above, the CIR output unit 114d and CIR output unit 214d calculate missing CIRs on the basis of the CIRs supplied from the CIR detection unit 114a, but this scheme is not limiting. For example, the CIR output units 114d, 214d may give instructions to the CIR detection unit 114a to change (shorten) the CIR detection interval in such a way that the missing CIRs can be detected. In that case, the CIR output units 114d, 214d preferably give instructions to the CIR detection unit 114a to change (lengthen) the CIR detection interval when the equivalent width becomes long.

Alternatively, the CIR detection unit 114a may detect CIRs at minimum processable intervals, and if there are missing CIRs even then, the CIR output units 114d, 214d may calculate them by interpolation or extrapolation.

REFERENCE CHARACTERS 100, 200: receiver device, 101: signal processing device, 104: error correction device, 105: memory device, 110, 210: equalization device, 111: received signal storage unit, 112: adjustment unit, 113: signal selection unit, 114, 214: channel estimation unit, 114a: CIR detection unit, 114b: CIR variation detection unit, 114c, 214c: equivalent width control unit, 114d, 214d: CIR output unit, 114e, 214e: CIR Generating unit, 214f: long delay detection unit, 115, 215: waveform equalization unit, 115a, 215a: first Fourier transform unit, 115b, 215b: second Fourier transform unit, 115c, 215c: equalizing unit, 115d, 215d: inverse Fourier transform unit, 215e: window function multiplication unit, 215f: overlap unit.

What is claimed is:
1. An equalizer device comprising:
a CIR generator that generates a channel impulse response from a received signal;
a CIR variation detector that uses a plurality of channel impulse responses generated from a plurality of different sections of the received signal by the CIR generator that detects an amount of variation in the channel impulse response;
an equivalent width controller that determines an equivalent width corresponding to a signal length used in equalization of the received signal such that the equivalent width is shortened as the amount of variation in the channel impulse response increases; and
a waveform equalizer that uses the channel impulse response generated by the CIR generator to equalize the received signal over the equivalent width determined by the equivalent width controller and generate a demodulated signal.

2. The equalizer device of claim 1, wherein:
the received signal includes a known signal;
the CIR generator that generates a first channel impulse response from the known signal and a first section of the received signal corresponding to the known signal, and generates a second channel impulse response from a second section of the demodulated signal generated by the waveform equalizer and a section of the received signal corresponding to the second section, the second section excluding the known signal; and
the CIR variation detector uses a plurality of channel impulse responses including at least one of the first channel impulse response and the second channel impulse response to detect the amount of variation in the channel impulse response.

3. The equalizer device of claim 2, wherein the CIR generator generates the one of the first channel impulse response and the second channel impulse response in correspondence to a Fourier transform interval used when the waveform equalizer equalizes the received signal over the equivalent width determined by equivalent width controller.

4. The equalizer device of claim 2, wherein the CIR generator generates one of the first channel impulse response, the second channel impulse response, and a third channel impulse response in correspondence to a Fourier transform interval used when the waveform equalizer equalizes the received signal over the equivalent width determined by equivalent width controller, the third channel impulse response being generated by interpolation or extrapolation using a plurality of channel impulse responses including at least one of the first channel impulse response and the second channel impulse response.

5. The equalizer device of claim 1, wherein the equivalent width controller both shortens the equivalent width as the amount of variation in the channel impulse response increases and lengthens the equivalent width with increasing magnitude of long delay components included in the received signal.

6. The equalizer device of claim 5, wherein the equivalent width controller identifies, among coefficients included in the channel impulse response that are disposed in tap positions more delayed than a predetermined tap position, coefficients having values exceeding a predetermined threshold value, and determines that the long delay components have increasing magnitude as the values of the identified coefficients increase.

7. The equalizer device of claim 1, wherein the equivalent width controller both shortens the equivalent width as the amount of variation in the channel impulse response increases and lengthens the equivalent width with increasing delay of long delay components included in the received signal.

8. The equalizer device of claim 7, wherein the equivalent width controller identifies, among coefficients included in the channel impulse response that are disposed in tap positions more delayed than a predetermined tap position, coefficients having values exceeding a predetermined threshold value, and determines that the long delay components have increasing delay as the tap positions of the identified coefficients have increasing amounts of delay.

9. The equalizer device of claim 1, wherein the waveform equalizer:
generates a reconstructed signal by equalizing the received signal after making a width of a window function by which the received signal is multiplied correspond to the equivalent width determined by the equivalent width controller; and
generates the demodulated signal by overlapping the reconstructed signal at overlap intervals corresponding to the equivalent width determined by the equivalent width controller.

10. A receiver device comprising:
the equalizer device of claim 1; and
a signal processing device for generating the received signal by converting a broadcast signal to a prescribed frequency band.

11. An equalization method comprising:
generating an channel impulse response from a received signal;
using a plurality of channel impulse responses generated from a plurality of different sections of the received signal to detect an amount of variation in the channel impulse response;
determining an equivalent width corresponding to a signal length used in equalization of the received signal such that the equivalent width is shortened as the amount of variation in the channel impulse response increases; and
using the channel impulse response generated to equalize the received signal over the equivalent width determined in the equivalent width control step and generate a demodulated signal.

12. The equalization method of claim 11, wherein:
the received signal includes a known signal;
further generating a first channel impulse response from the known signal and a first section of the received signal corresponding to the known signal, and generating a second channel impulse response from a second section of the demodulated signal generated, and a section of the received signal corresponding to the second section, the second section excluding the known signal; and
using a plurality of channel impulse responses including at least one of the first channel impulse response and the second channel impulse response to detect the amount of variation in the channel impulse response.

13. The equalization method of claim 12, further generating the one of the first channel impulse response and the second channel impulse response in correspondence to a Fourier transform interval used when the the received signal is equalized over the equivalent width determined in the equivalent width control step.

14. The equalization method of claim 12, further generating one of the first channel impulse response, the second channel impulse response, and a third channel impulse response in correspondence to a Fourier transform interval used when the the received signal is equalized over the equivalent width determined in the equivalent width control step, the third channel impulse response being generated by interpolation or extrapolation using a plurality of channel impulse responses including at least one of the first channel impulse response and the second channel impulse response.

15. The equalization method of claim 11, wherein the equivalent width is shortened as the amount of variation in the channel impulse response increases and lengthened with increasing magnitude of long delay components included in the received signal.

16. The equalization method of claim 15, further identifying, among coefficients included in the channel impulse response that are disposed in tap positions more delayed than a predetermined tap position, coefficients having values exceeding a predetermined threshold value, and determining that the long delay components have increasing magnitude as the values of the identified coefficients increase.

17. The equalization method of claim 11, wherein the equivalent width is shortened as the amount of variation in the channel impulse response increases and lengthened with increasing delay of long delay components included in the received signal.

18. The equalization method of claim 17, further identifying, among coefficients included in the channel impulse response that are disposed in tap positions more delayed than a predetermined tap position, coefficients having values exceeding a predetermined threshold value, and determining that the long delay components have increasing delay as the tap positions of the identified coefficients have increasing amounts of delay.

19. The equalization method of claim 11, further comprising:
- generating a reconstructed signal by equalizing the received signal after making a width of a window function by which the received signal is multiplied correspond to the equivalent width determined; and
- generating the demodulated signal by overlapping the reconstructed signal at overlap intervals corresponding to the equivalent width.

* * * * *